United States Patent Office 2,978,035
Patented Apr. 4, 1961

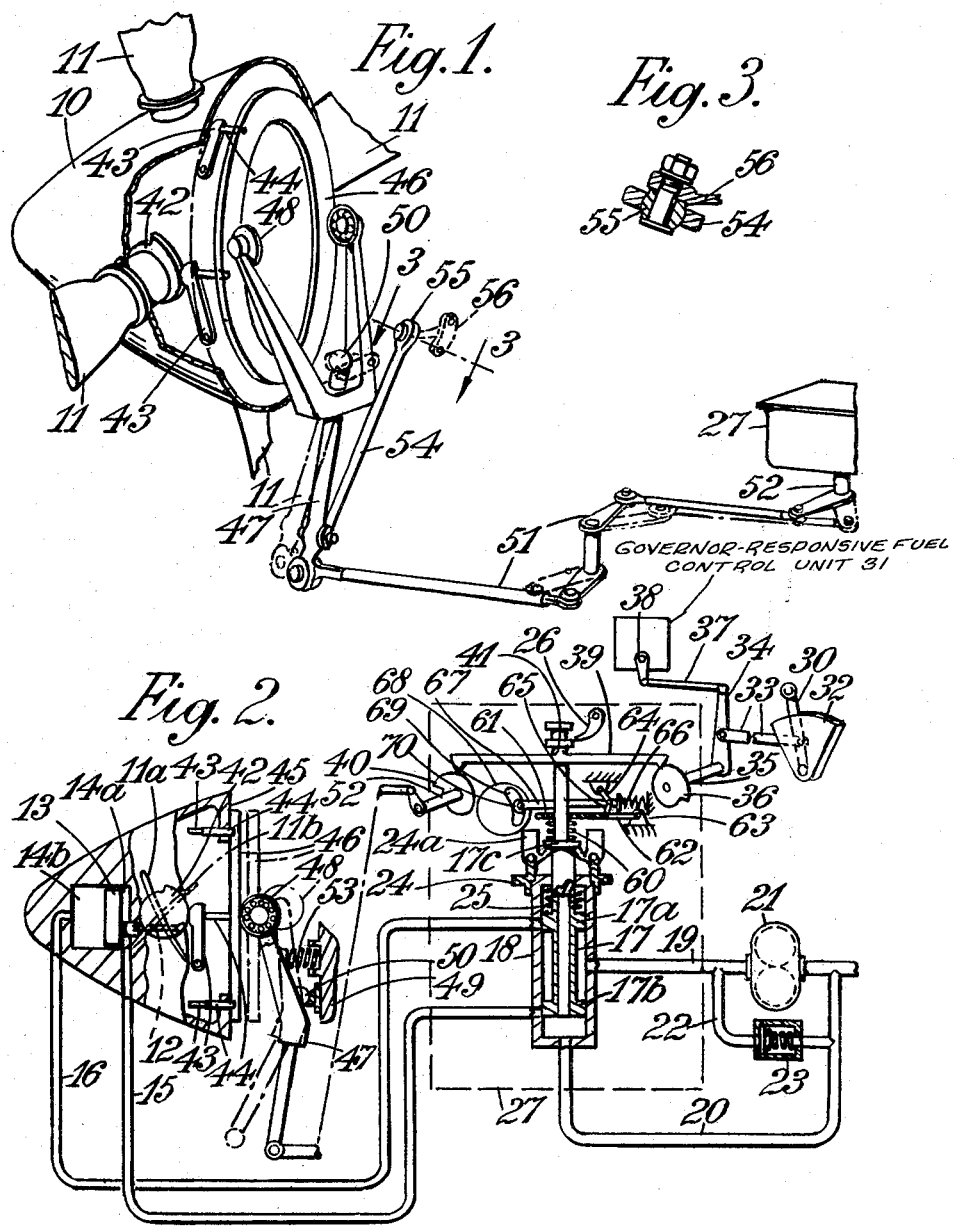

2,978,035

CONTROL MECHANISMS FOR VARIABLE-PITCH PROPELLERS

Lionel Haworth, Loughborough, England, assignor to Rolls-Royce Limited, Derby, England, a British company Filed May 25, 1959, Ser. No. 815,711

Claims priority, application Great Britain June 5, 1958

9 Claims. (Cl. 170—135.74)

This invention comprises improvements in or relating to control mechanisms for variable pitch propellers of the kind having blades capable of being moved to a reverse pitch setting to produce a braking thrust on an aircraft.

According to the present invention, a control mechanism for a variable pitch propeller of the kind referred to comprises power means connected to the propeller to move it to a reverse pitch setting, a reverse pitch selector lever adjustable to initiate operation of the power means to move the propeller blades to a reverse pitch setting and to select the desired reverse pitch setting, and a feedback mechanism actuated in accordance with movement of the propeller blades to a reverse pitch setting and operative to control the power means to render it inoperative when the propeller has reached the reverse pitch setting selected by the lever.

A variable-pitch propeller is usually controlled in normal pitch i.e. its pitch for forward thrust, by means of an hydraulic motor the operation of which is controlled by a constant speed unit comprising a valve controlling the flow of operating liquid to the hydraulic motor and a centrifugal governor device driven at a speed proportional to the propeller speed and actuating the valve so as to adjust it to maintain a selected speed of the propeller.

Preferably, the power means of this invention is the hydraulic motor provided for normal control of the propeller and means is provided to enable the reverse pitch selector lever and feed-back mechanism to over-ride the centrifugal governor device in controlling the valve of the constant speed unit, the selector lever being arranged to move the valve to allow operating fluid to flow to the hydraulic motor in the sense to adjust the propeller to a reverse pitch setting and the feed-back mechanism adjusting the valve back towards a neutral setting as the propeller moves towards its selected reverse pitch setting.

According to a feature of this invention, the feedback mechanism may comprise cam means which rotate with the propeller blades as they are adjusted in pitch, a thrust plate rotating coaxially with the propeller and displaceable axially of the propeller by the cam means, and a feed-back lever which is pivoted to non-rotating structure, is rockable by the thrust plate and is connected to the valve to adjust it.

Preferably the feed-back lever is forked at one end and carries at the ends of the fork arms rollers co-operating with the thrust plate at diametrically opposite points and the lever is mounted in the non-rotating structure by a universal connection, and there is provided a stabilising link for the feed-back lever, which link is pivoted to a point on the lever remote from its universal mounting, diverges from the lever, and has a universal connection with the non-rotating structure at a point which is contained in a plane at right angles to the rotational axis of the propeller and which is spaced from the pivotal connection of the link and lever by a distance equal to the distance between said pivotal point between the link and lever and the centre of the universal connection of the lever.

According to a preferred feature of this invention the reverse fuel selector lever is also connected to adjust fuel control means to increase the fuel supply as the selected value of the reverse pitch setting is increased.

One construction of control mechanism according to this invention will now be described with reference to the accompanying drawings in which—

Figure 1 shows diagrammatically a propeller and part of the control mechanism,

Figure 2 shows diagrammatically the whole control mechanism, and

Figure 3 is a section on the line 3—3 of Figure 1.

In Figure 1 there is shown a propeller of the variable-pitch kind comprising a hub 10 and four propeller blades 11 which are rotatively mounted in the hub 10 to permit changes in the pitch setting of the blades.

The root end of each blade 11 has eccentrically connected to it one end of a link 12 (Figure 2) the opposite end of which is connected to a piston 13 forming the movable element of an hydraulic motor. The piston 13 divides a cylinder into two cylinder spaces 14a, 14b, having operating liquid supply pipes 15 and 16 respectively. On supply of pressure liquid to the space 14a the propeller blades are adjusted from a normal operation pitch setting as shown in full lines at 11a in Figure 2, towards a reverse pitch setting shown in dotted lines at 11b in Figure 2. On supply of pressure fluid to the space 14b the blades 11 are moved from a reverse pitch setting towards a normal pitch setting.

The supply of operating fluid to the hydraulic motor 13, 14a, 14b is controlled by a piston valve 17 having a pair of lands 17a, 17b, the piston valve 17 working in a cylinder 18 to which the pipes 15 and 16 are connected so as to be covered by the lands 17a, 17b in a neutral setting of the valve 17. Also connected to the cylinder 18 there is a pressure liquid supply pipe 19 which opens into the cylinder 18 between lands 17a, 17b and a return liquid pipe 20 which is in communication with both ends of the cylinder. Pressure liquid is fed to the pipe 19 by means of a pump 21 the inlet and outlet sides of which are connected by a by-pass 22 containing a non-return valve 23 which permits any excess of liquid delivered by the pump 21 to flow from the outlet side of it back to its inlet side.

The valve 17, 18 forms part of a constant speed unit which is used during normal operation, i.e. when the propeller is in a forward thrust pitch setting, to control the pitch of the propeller to maintain a constant rotational speed. The constant speed unit also includes a centrifugal governor device 24 which is rotated at a speed proportional to the propeller speed, comprising fly-bobs 24a which act on an extension 17c of the valve 17 so as to tend to move it upwardly as the rotational speed of the propeller increases, the upward movement being made against the action of springs 25 and 60, the spring 60 having an adjustable abutment whereby the spring loading may be selected to adjust the speed at which the device 24 controls the propeller. It will be seen that as the rotational speed of the governor device 24 is increased the valve 17 is moved upwardly permitting pressure fluid to be fed to the space 14b whereby the pitch of the propeller blades 11 is coarsened so that its rotational speed tends to decrease. Conversely, on a reduction of the rotational speed of the propeller the valve 17 is moved downwardly by the spring 25 and pressure fluid is fed to the space 14a so reducing the pitch of the propeller and permitting its speed to increase. The constant speed unit also comprises a lever 26 by which the valve 17 may be raised when it is desired to feather the propeller.

The adjustable abutment for spring 60 is formed by a lever 61 pivoted at 63 to fixed structure 62 and having connected to it a toggle linkage 64, 65 which is loaded by spring 66 in the sense of increasing the load of spring 60 and which is connected to a rod 67 carrying a follower 70 operating in a cam track 69 of a cam 68. On rotation of cam 68, the lever 61 is rocked so adjusting the load applied by spring 60 to the valve 17.

The constant speed unit is indicated in Figure 1 at 27.

In order to select the blade pitch angle in the reverse thrust setting of the propeller, there is provided a selector lever 30 by which the desired reverse pitch angle is selected and a feed-back mechanism operated by the blades 11 as they move into reverse pitch, and the lever 30 and the feed-back mechanism together control the fluid supply to the hydraulic motor 13, 14a, 14b. The lever 30 is also shown as setting a fuel supply control unit 31 for the engine so that as the reverse pitch angle is increased the fuel supply is increased.

The selector lever 30 moves in a gate 32 and clockwise movement corresponds to increase in pitch angle or reverse coarsening of the blades 11.

The lever 30 is connected by a link 33 to an arm 34 mounted on a rocking shaft 35 which carries a cam 36 and which also carries the cam 68 above referred to. The arm 34 is connected by a link 37 to an adjusting lever 38 of the fuel control unit 31. The cam 36 moves one end of a floating lever 39, the opposite end of which is moved by a second cam 40 and which at a point in its length has a nose 41 adapted in certain positions of the lever 39 to abut the end of valve extension 17c.

The cam 40 is moved in accordance with the movements of the blades 11 of the propeller in the reverse pitch setting as follows. Each blade 11 carries a cam 42 at its root end, which cam is engaged by a follower 43 in the form of a lever pivoted to the hub 10. Each follower 43 is engaged by a tappet 44 projecting axially of the propeller hub 10 from an annular thrust plate 46 and slidable axially in bores in a flange 45 at the rear of the hub. As the blades 11 move into reverse pitch, the thrust plate 46 is moved axially rearwards relative to the hub 10 whilst rotating with it.

The thrust plate 46 is employed to rock a feed-back lever 47, one arm of which is forked to carry a pair of rollers 48 bearing on the thrust plate 46 at diametrically opposite points, the lever 47 being pivoted in non-rotating engine structure 49 by a ball type universal connection 50. The other arm of the lever 47 is connected by a suitable linkage 51 (Figure 1) to rock a spindle 52 which carries cam 40. As the reverse pitch angle increases so the cam 40 is rotated clockwise as viewed in Figure 2. A spring 53 bears on the lever 47 to hold the rollers 48 in contact with the thrust plate 46.

The feed-back lever 47 is stabilised as to its position radially of the propeller axis by a link 54 which is pivoted at one end to the lever 47 adjacent its point of connection with linkage 51 and which is connected at its opposite end by a ball connection 55 (Figure 3) to a bracket 56 mounted on non-rotating structure. The pivotal axis of the connection between lever 47 and link 54 is parallel to the propeller axis, and the link 54 diverges from the lever 47. Also the centre of the ball connection 55 is at a distance from this pivotal axis equal to the distance from this axis of the centre of the universal connection 50, and the two centres are in a plane at right angles to the propeller axis. The lever 47 is thus prevented from rocking laterally of the propeller axis.

When reverse pitch is to be selected, the centrifugal device 24 is rendered inoperative by being set, by adjusting cam 68 so as to increase the load applied by spring 60, to tend to control the speed of the propeller at a value not reached in reverse thrust operation and thus the springs 25, 60 displace the valve 17 downwards so that the valve extension 17c bears on nose 41 and the position of valve 17 is determined by floating lever 39. In order to obtain reverse thrust, the selector lever 30 is rocked clockwise thereby rotating cam 36 clockwise to lower the right hand end of lever 39 and thus also nose 41 and permitting the valve 17 to be moved downwardly by springs 25, 60. This movement of valve 17 allows pressure liquid to be fed to space 14a and the propeller blades 11 are moved angularly towards the reverse pitch setting. This movement of the blades 11 is accompanied by rotation of cams 42 and results in rearward displacement of the thrust plate 46 with consequent rocking of lever 47 and clockwise rotation of cam 40 which lifts the left hand end of lever 39 and thus raises nose 41 until the valve 17 returns to its neutral position, when movement of the piston 13 of the hydraulic motor ceases. It will thus be clear that for each setting of the selector lever 30 there is a corresponding reverse pitch setting of the blades 11, and further due to the fact that the selector lever 30 also adjusts the fuel control unit 31 there is a corresponding rate of fuel supply to the engine driving the propeller. This fuel supply may be trimmed by a governor so that the rotational speed of the propeller does not exceed a value at which the centrifugal governor device 24 of the constant speed unit becomes operative, thereby ensuring that the constant speed unit is overriden by the reverse pitch control.

It will be arranged that during normal forward thrust operation the nose 41 is clear of the extension 17c to avoid interference with the action of the constant speed unit.

The selector lever 30 may be the normal pilot's engine power control lever modified by being provided with an extra range of movement corresponding to reverse thrust operation, and in this case the floating lever may be moved clear of the extension 17c during forward thrust operation by suitably shaping the cams 36, 40.

The invention has an important application in aircraft powered by propeller-driving gas turbine engines for instance two-spool engines whereof the low-pressure rotor drives the propeller.

I claim:

1. A control mechanism for a variable pitch propeller having blades adjustable in pitch through a normal pitch range and a reverse pitch range, said control mechanism comprising an hydraulic motor connected to adjust the blades in both said pitch ranges, an operating liquid supply for said hydraulic motor, a valve connected in said operating liquid supply and controlling the flow of operating liquid to the hydraulic motor, a centrifugal governor device driven at a speed proportional to the propeller speed and actuating the valve to maintain a selected speed of the propeller, a reverse pitch selector lever which is adjustable to select the desired reverse pitch setting and which on adjustment to select reverse pitch overrides the centrifugal governor device and adjusts the valve in the sense to cause operation of the hydraulic motor to move the blades into the reverse pitch range, and a feed-back mechanism actuated in accordance with movement of the propeller blades to a reverse pitch setting and connected to adjust the valve and to return the valve to a neutral setting to render the power means inoperative when the propeller has reached the reverse pitch setting selected by the selector lever, said feed-back mechanism comprising cam means mounted to rotate with the propeller blades as they are adjusted in pitch, a thrust plate rotating coaxially with the propeller and displaceable axially of the propeller by the cam means, a feed-back lever, non-rotating structure, a universal connection pivotally supporting the feed-back lever on the non-rotating structure, said feed-back lever being forked at one end to have a pair of fork arms, rollers mounted on the ends of the fork arms and bearing on the thrust plate at diametrically opposite points thereof, whereby the feed-back lever is rocked on displacement of the thrust plate, said feed-back lever being connected to the valve to adjust it, and a stabilizing link for the feed-back lever, which link is pivoted to a point on the feed-back lever remote from its universal mounting, diverges from the feed-back lever, and has a universal connection with the non-rotating structure at a point which is contained in a plane at right angles to the rotational axis of the propeller and which is spaced from the pivotal connection of the link and feed-back lever by a distance equal to the distance between said pivotal point between the link and feed-back lever and the center of the universal connection of the feed-back lever.

2. A control mechanism according to claim 1 comprising a floating lever, first and second cams supporting the floating lever at its ends, said first cam being connected to be rotated by the selector lever and said second cam being connected to be rotated by rocking of the feed-back lever, the floating lever between its ends engaging the valve, rotation of the first cam on adjustment if the selector lever in the sense of increasing the reverse pitch setting of the propeller blades adjusting the valve to cause operating fluid to flow to the hydraulic motor to increase the reverse pitch setting, and rotation of the second cam due to rocking of the feed-back lever as the reverse pitch increases causing adjustment of the valve towards its neutral setting.

3. A control mechanism according to claim 1 comprising a spring loading the valve in opposition to the centrifugal governor device, and an adjustable abutment for the spring, the abutment being set, when reverse pitch is to be selected, so that the governor device tends to control the propeller speed at a value not reached in reverse pitch operation.

4. A control mechanism according to claim 3, wherein the adjustable abutment comprises a lever, a toggle linkage connected to the lever, a further spring acting on the toggle linkage in a sense to adjust the lever to increase the load of the valve-loading spring, and a cam connected to the toggle linkage to adjust it against the action of the further spring.

5. A control mechanism according to claim 1 comprising also fuel control means for an engine driving the propeller, the selector lever being also connected to adjust the fuel control means to increase the fuel supply as the selected value of reverse pitch setting is increased.

6. A control mechanism according to claim 5, wherein the fuel supply means includes a governor responsive to the speed of the propeller and adapted to trim the fuel supply to prevent, in reverse pitch operation, the speed exceeding the value at which the constant speed unit tends to become operative.

7. A control mechanism according to claim 1 wherein the selector lever is the normal pilot's engine power control lever modified by the provision of an extra range of movement corresponding to reverse pitch operation.

8. In combination, an aircraft power plant comprising a gas-turbine engine, a propeller driven by the engine, the propeller having blades capable of being moved to a reverse pitch setting and a control mechanism for the blades as claimed in claim 1.

9. A control mechanism for a variable pitch propeller having blades adjustable in pitch through a normal pitch range and a reverse pitch range, said control mechanism comprising an hydraulic motor connected to adjust the blades in both said pitch ranges, an operating liquid supply for said hydraulic motor, a valve connected in said operating liquid supply and controlling the flow of operating liquid to the hydraulic motor, a centrifugal governor device driven at a speed proportional to the propeller speed and actuating the valve to maintain a selected speed of the propeller, a reverse pitch selector lever which is adjustable to select the desired reverse pitch setting and which on adjustment to select reverse pitch over-rides the centrifugal governor device and adjusts the valve in the sense to cause operation of the hydraulic motor to move the blades into the reverse pitch range, and a feed-back mechanism actuated in accordance with movement of the propeller blades to a reverse pitch setting and connected to adjust the valve and to return the valve to a neutral setting to render the power means inoperative when the propeller has reached the reverse pitch setting selected by the selector lever, said feed-back mechanism comprising a cam mounted at the root of each propeller blade to rotate therewith as the blade is adjusted in pitch, a follower lever engaging each cam to be rocked on rotation of the cam, a thrust plate rotating coaxially with the propeller and displaceable axially of the propeller, a series of tappets mounted on the thrust plate and supporting the thrust plate for said axial displacement, said tappets engaging the follower levers to be displaced axially thereby, a feed-back lever, non-rotating structure, a universal connection pivotally supporting the feed-back lever in the non-rotating structure, said feed-back lever being forked at one end to have a pair of fork arms, rollers mounted on the ends of the fork arms and bearing on the thrust plate at diametrically opposite points thereof, whereby the feed-back lever is rocked on displacement of the thrust plate, said feed-back lever being connected to the valve to adjust it, and a stabilizing link for the feed-back lever, which link is pivoted to a point on the feed-back lever remote from its universal mounting, diverges from the feed-back lever, and has a universal connection with the non-rotating structure at a point which is contained in a plane at right angles to the rotational axis of the propeller and which is spaced from the pivotal connection of the link and feed-back lever by a distance equal to the distance between said pivotal point between the link and feed-back lever and the center of the universal connection of the feed-back lever.

References Cited in the file of this patent
UNITED STATES PATENTS

| | | |
|---|---|---|
| 2,638,993 | Woodward | May 19, 1953 |
| 2,781,856 | Danvers | Feb. 19, 1957 |
| 2,785,848 | Lombard | Mar. 19, 1957 |